United States Patent [19]

Scozzafava

[11] 4,231,675
[45] Nov. 4, 1980

[54] MOUNTING DEVICE

[76] Inventor: Milton V. Scozzafava, 17835 Contador Dr., Rowland Heights, Calif. 91748

[21] Appl. No.: 29,489

[22] Filed: Apr. 12, 1979

[51] Int. Cl.³ .......................... B25G 3/00; F16B 9/00
[52] U.S. Cl. .................................... 403/252; 403/348
[58] Field of Search .............. 403/252, 254, 353, 408, 403/348

[56] References Cited

U.S. PATENT DOCUMENTS

| | | | |
|---|---|---|---|
| 2,115,495 | 4/1938 | Mapelsden | 403/252 X |
| 3,370,873 | 2/1968 | Holton | 403/408 |
| 3,542,980 | 11/1970 | Hamilton | 403/252 X |
| 3,631,738 | 1/1972 | Harper | 403/252 X |
| 3,954,344 | 5/1976 | Nakama | 403/408 |

Primary Examiner—Werner H. Schroeder

[57] ABSTRACT

A device for mounting a member onto a plate having a hole therein with diametrically opposed notches opening into the hole. A bearing formed on the member snugly fits within the hole and spring arms carried by a head extending from the bearing pass through the notches only when the head is inserted in the hole and then rotated whereby the free ends of the spring arms firmly engage the adjacent side of the plate to lock the member to the plate.

5 Claims, 7 Drawing Figures

4,231,675

MOUNTING DEVICE

BACKGROUND OF THE INVENTION

1. Field of the Invention

This invention relates to means for mounting a member, such as a post, onto a plate or the like.

2. Description of the Prior Art

Heretofore, posts and other members have generally been secured to base plates or panels by screws extending through the plate and threaded into the post or by nuts threaded over studs extending through the plate and either formed integral with the post or suitably secured thereto. Such screw mounting devices are relatively expensive and often result in stripping of the screw threads, particularly when threading the same into or over plastic material. Also, such mounting devices cannot normally be used in blind hole situations where it is not possible to gain access to both sides of the base plate.

SUMMARY OF THE INVENTION

A principal object of the present invention is to provide a device for securely mounting a member to a plate or the like in which the device may be formed integrally with the member.

Another object is to provide a device of the above type in which the device may be formed of plastic material.

Another object is to provide a device of the above type which may be used in blind hole situations where access cannot be had to both sides of the plate to which the member is to be mounted.

Another object is to provide a device of the above type which may be accurately located in position on a plate or the like.

According to the present invention, a device is provided for securely mounting a member, such as a post, on a plate or the like, the device being formed integrally on the member. The plate is provided with a round hole and diametrically opposed notches opening into the hole.

The device has a bearing which snugly fits in the hole. A head extending from one end of the bearing comprises opposed spring arms which diverge outwardly and rearwardly toward the bearing. Upon inserting the head into the hole, the spring arms are flexed inwardly toward each other, but such arms are of such length that they will not pass completely through the plate. However, upon rotating the member, the spring arms are flexed sideways sufficiently to enable the free ends of the arms to move out of the notches whereby they may frictionally engage the side of the plate and press thereagainst to firmly lock the member in position.

BRIEF DESCRIPTION OF THE DRAWING

The manner in which the above and other objects of the invention are accomplished will be readily understood on reference to the following specification when read in conjunction with the accompanying drawing, wherein.

DESCRIPTION OF THE PREFERRED EMBODIMENT

Figure 1:
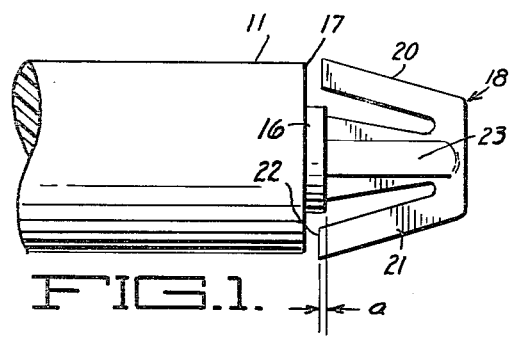
FIG. 1 is a side view of a post having a mounting device integrally formed at one end thereof, embodying a preferred form of the present invention.

While this invention is susceptible to embodiment in many different forms, there is shown in the drawing and will be described in detail certain specific embodiments, with the understanding that the present disclosure is to be considered as an exemplification of the principles of the invention and is not intended to limit the invention to the particular embodiments illustrated.

Figure 5:
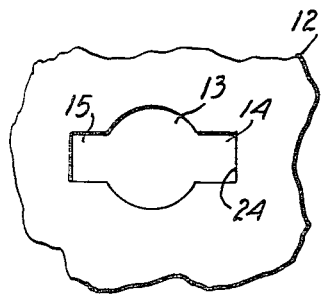
FIG. 5 is a fragmentary front view of the plate depicting the shape of the mounting hole therein.

Referring to the drawing, a cylindrical post 11, preferably of plastic, is depicted for attachment to a plate 12 of metal, plastic, or the like material. As seen in FIG. 5, the plate 12 has a round hole 13 formed therein at precisely the location at which the post 11 is to be secured. Diametrically opposed radially extending notches 14 and 15 are also formed in the plate 12 and open into the hole 13.

According to the present invention, the forward end of the post 11 has a cylindrical bearing 16 formed integrally therewith. The diameter of the bearing 16 is reduced to form an engaging surface 17 at the end of the post and such diameter is also such that the bearing 16 will snugly, but rotatably fit within the hole 13. The length of the bearing 16 is preferably the same as the thickness of the plate 12.

A head 18 is integrally formed on the forward end of the bearing 16 and comprises two rearwardly extending and diverging spring arms 20 and 21. The free ends 22 of the spring arms terminate a slight distance "a" rearwardly of the plane of the adjacent end of the bearing 16. That is, the distance between the free ends 22 and the shoulder 17 is normally slightly less than the thickness of the plate 12.

Stiffener ribs 23 are formed on opposite sides of the head. Such ribs are integral with the end of bearing 16 and converge forwardly along the sides of the head 18.

It will be noted that each of the arms 20 and 21 has a substantially square cross section, enabling the same to readily flex in diametrically opposed directions and also sideways.

The spring arms 20 and 21 are of a width such that they will readily pass through the notches 14 and 15. However, as measured diametrically across the bearing 16, the distance across the free ends 22 is somewhat greater than the distance across the opposite ends 24 of the notches 14 and 15, as will be readily seen in FIG. 4. Accordingly, when the head 18 is inserted in the hole 13, with the spring arms fitting within the notches 14 and 15, the spring arms will be flexed inwardly a small amount.

Figure 2:
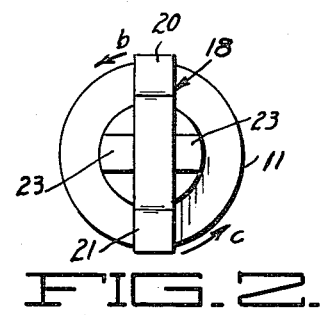
FIG. 2 is an end view of the mounting device and post.
Figure 3:
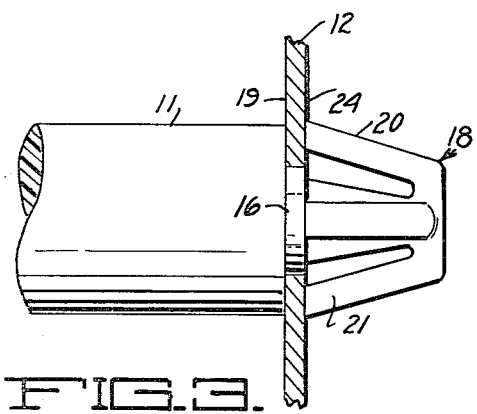
FIG. 3 is a side view, similar to FIG. 1, but illustrating the post mounted on a base plate.
Figure 4:
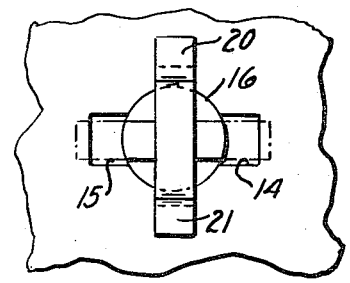
FIG. 4 is an end view of the assembly shown in FIG. 3.

As the head 18 is pushed fully through the hole 13 to fit the bearing 16 in the hole, the free ends 22 of the arms 20 and 21 will not quite clear the outer or forward surface 24 of the plate 12 due to the overhanging distance "a". However, when in such fully inserted position, rotation of the post 11 about its axis will cause the arms 20 and 21 to flex sideways, i.e. in the direction of the arrows "b" and "c" (FIG. 2), enabling the free ends thereof to drag over the surface 24, while yieldably pressing thereagainst. When the post 11 has been rotated a sufficient amount, for example 90°, as indicated in FIG. 4, the arms 20 and 21 will firmly engage the surface 24 to hold the shoulder 17 firmly against the rear surface 19 of the plate.

It will be noted that the arms 20 and 21 return to substantially their original positions after the post 11 has been rotated to remove the arms from the notches 14 and 15, and in so doing, their free ends spring outwardly beyond the ends 24 of the notches 14 and 15. Therefore, the arms will lock the post 11 to the plate 12 in any rotated position thereof.

It will be further noted that the post can be installed in blind locations, i.e. where the side 24 of plate 12 may not be accessible.

DESCRIPTION OF MODIFIED FORM OF THE INVENTION

Figure 6:
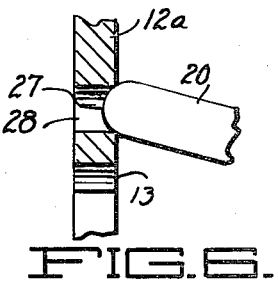
FIG. 6 is an enlarged fragmentary sectional view showing a modified form of the present invention.

FIG. 6 illustrates a modified form of the invention in which the free ends of the spring arms are rounded as indicated at 27 to detent into diametrically opposed detenting holes, one of which is shown at 28, when the post 11 has been rotated to locking position. Obviously, only one detenting hole may be provided, if desired.

DESCRIPTION OF SECOND MODIFIED FORM OF THE INVENTION

Figure 7:
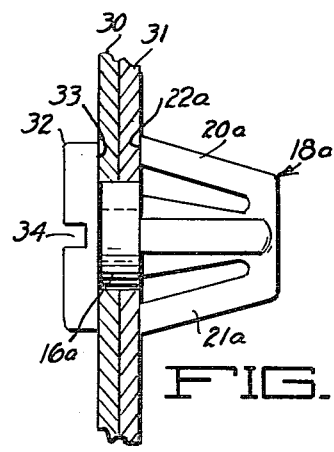
FIG. 7 is a side view, partly in section, showing another modified form of the present invention for use in fastening two sheets or plates together.

FIG. 7 illustrates another modified form of the invention which is intended to secure two plates 30 and 31 together. Although a post, similar to post 11, may be employed to be supported by both plates, a head or cap 32 is shown as being provided instead, having a bearing 16a projecting therefrom and preferably having a length equal to the combined thickness of the two plates 30 and 31. A diametriclly extending slot 34 is formed in the cap 32.

Both plates 30 and 31 have holes and associated notches formed therein, each similar in shape to that shown in FIG. 5.

A head 18a, having spring arms 20a and 21a similar to arms 20 and 21, is integrally formed on the end of the bearing 16a. The normal distance between the free ends 22a of the spring arms and the adjacent shoulder 33 of the cap 32 is slightly less than the combined thickness of the two plates so that, when the member is rotated, as by means of a suitable tool inserted in the slot 34, the spring arms will flex sideways and will move out of the notches and will firmly press plate 31 against plate 30.

I claim:

1. A device for mounting a member on a plate, said plate having a round hole therein with diametrically opposed notches opening into said hole,
   comprising: a bearing integral with said member and adapted to fit within said hole for rotation about the axis of said hole,
   a head projecting forwardly from the end of said bearing opposite said member,
   two spring arms integral with said head at their forward ends,
   said member, bearing, head, and arms being unyielding in an axial direction,
   said arms diverging outwardly and rearwardly,
   said arms being adapted to pass through said notches, the distance between the rear ends of said arms and said member being less than the thickness of said plate, and
   said arms being adapted to flex in a circumferential direction when said bearing is fitted in said hole and said member is subsequently rotated relative to said plate whereby to enable said arms to move out of said notches and to press said member against said plate.

2. A device as defined in claim 1 wherein said bearing is cylindrical and of a diameter to rotatably fit within said hole.

3. A device as defined in claim 1 wherein the distance between said free ends of said arms is normally greater than the distance between the opposite ends of said notches whereby said arms will flex toward each other during passage thereof through said notches.

4. A device for mounting a member on a flat plate, said plate having a round hole therein with diametrically opposed radially extending notches opening into said hole,
   comprising: a cylindrical bearing integral with said member and of a diameter to fit within said hole for rotation about the axis of said hole,
   a head projecting forwardly from said bearing,
   a pair of diametrically opposed spring arms integral with said head at their forward ends, said member, bearing, head, and arms being unyielding in an axial direction,
   the rear ends of said arms diverging outwardly and rearwardly.
   said arms being adapted to pass through said notches,
   said rear ends of said arms terminating a distance from said member less than the thickness of said plate,
   said arms being adapted to flex toward each other and in a circumferential direction when said head is fitted in said hole and subsequentially rotated whereby to move said rear ends out of said notches to enable said arms to press said member against said plate.

5. A device for mounting two plates together,
   said plates each having a round hole therein with diametrically opposite radially extending notches opening into said hole,
   comprising: a member having a head formation,
   a cylindrical bearing projecting forwardly of said head formation,
   said bearing having a diameter to fit within said holes for rotation about the axis of said holes,
   said bearing being of a smaller diameter than said head formation to form an engaging shoulder,
   a head projecting forwardly from said bearing,
   a pair of rearwardly and outwardly diverging spring arms integral with said head at their forward ends,
   said member, bearing, head, and arms being unyielding in an axial direction,
   the distance between the rear ends of said arms and said engaging shoulder being less than the combined thickness of said plates,
   said arms being adapted to flex laterally in a circumferential direction, when said bearing is fitted in said hole and said member is rotated relative to said plates whereby to enable said arms to press said plates against said engaging shoulder.

* * * * *